UNITED STATES PATENT OFFICE.

WALTER SCHERMERHORN, OF OMAHA, NEBRASKA.

PROTECTIVE COATING COMPOSITION.

1,204,697. Specification of Letters Patent. Patented Nov. 14, 1916.

No Drawing. Application filed December 26, 1914. Serial No. 879,223.

*To all whom it may concern:*

Be it known that I, WALTER SCHERMERHORN, a citizen of the United States, and a resident of Omaha, in the county of Douglas and State of Nebraska, have invented certain new and useful Improvements in Protective Coating Compositions, of which the following is a specification.

My invention relates to compositions of matter, such as paints, fillers and varnishes, for coating and protecting surfaces of wood or metal that are exposed to the weather, especially such as the bodies and running gear of coaches, carriages, automobiles, railway passenger-cars, and the like.

It is the object of my invention to provide a composition for the above purposes which will form a waterproof coating for the surface to which it is applied; which will be strongly adherent to such surface, and sufficiently elastic to permit expansion and contraction thereof by changes of temperature, or distortion thereof by mechanical forces, without causing the protective coating to crack, chip or otherwise become detached from the surface; which will dry very quickly after its application, so as to enable other surface-finishing operations to be commenced without loss of time; and which by the application of a single coat thereof will effectually fill and cover all irregularities of the surface and produce a smooth and uniform surface such as is usually attainable only by the application of numerous coats of filler, rough-stuff, and the like, and rubbing down each of said coats after it has dried.

In the preparation of my composition I employ, as the primary ingredient thereof, the material known commercially as liquid gutta-percha. This is a milky, translucent fluid having the consistency of a thin syrup, and I understand it to be the undried sap or vegetable juice from which, by evaporation, the ordinary solid gutta-percha of commerce is obtained. I may also employ, instead of the natural juice or sap, a solution of the solid made by dissolving the same in a suitable liquid such as ether or benzene, the solution preferably being saturated or such that the entire solvent capacity of the liquid is utilized. The natural liquid is sometimes known as "gutta-milk," but in the following description I shall employ the term "liquid gutta-percha" to indicate either the natural liquid or the liquid artificially produced by dissolving the solid gutta-percha in a suitable solvent liquid.

The proportion of the liquid gutta-percha usually employed is about twenty per cent. (20%) of the entire composition, but the proportion may be varied somewhat according to the specific purpose for which the composition is to be employed. To the desired quantity of the liquid gutta-percha there is added an amount of benzene such as to constitute about fifteen per cent. (15%) of the entire composition. After mixing the foregoing ingredients, there is added thereto a quantity of ether such as to constitute about twenty-five per cent. (25%) of the entire composition. To the foregoing ingredients there is added a quantity of rye flour such as to constitute about twenty per cent. (20%) of the entire composition, and preferably, or whenever the specific purpose for which the composition is to be employed will permit of its being black or grayish in color, there is added an amount of plumbago such as to constitute about twenty per cent. (20%) of the entire composition.

The preferred ingredients of my composition, and what may be regarded as the normal proportions thereof, are as follows: Liquid gutta-percha, 20%; benzene, 15%; ether, 25%; rye flour, 20%; plumbago, 20%.

The rye flour and plumbago serve to thicken the mixture to a desirable consistency, and the composition may be made thicker by the use of a larger proportion of said ingredients, or by the use of smaller proportions of the benzene and ether, which may be considered as solvents and thinning ingredients.

For some purposes, other thickening ingredients, such as corn starch, may be employed in place of the rye flour, but in most cases the latter is preferable as it serves to materially increase the tenacity and adherent qualities of the composition. The plumbago is, of course, used in powdered form and all the ingredients are thoroughly mixed with each other before use. In the normal proportions the composition has the consistency of a thick paint and may be applied with a brush to the surface to be coated, similarly to paint. The plumbago, besides serving as a thickening and coloring material, facilitates the finishing or rubbing and smoothing operations upon the coated surface after the same has dried, the unctuous properties of the plumbago making it possible to produce a smooth, glossy surface with a minimum amount of rubbing. It is on this account that the plumbago is employed whenever the color or opacity imparted by it to the composition will not interfere with the use for which the latter is intended. In cases where the plumbago is objectionable, for the reasons stated, it may be omitted from the composition, or another coloring ingredient, such as dry ground red lead, substituted therefor. When but little, if any, coloring matter is used in the composition, the same when applied in a comparatively thin coat is sufficiently transparent to enable its use similarly to a varnish, as in the finishing of wood surfaces where it is desired to have the grain or markings of the wood surface visible through the finishing material.

Owing to the extremely volatile nature of the benzene and ether, the composition when applied to a surface will dry very quickly, and in a suitably ventilated room at a temperature of about 70° F. will be thoroughly dried in an hour or two, so that the rubbing or any further finishing operations may be commenced without delay. The drying of the composition is affected but very little by the humidity of the atmosphere in which it is placed.

Should the composition, by evaporation, become too thick for convenient application, it may be thinned by the addition of either benezene or ether, or both, and said materials may be employed also to cut or remove the composition from a surface after it has dried thereon. Oil of turpentine may also be used for removing the composition from a surface, but its action is hastened by first softening the coating by the application thereto of one of the other materials mentioned.

The composition after drying is impervious to water and forms a highly efficient protective coating for any surface to which it is applied. It is strongly adherent to surfaces of either wood or metal, and when used as a filler or foundation coating for painted or varnished surfaces, the latter finishing materials will readily adhere thereto. The protective coating formed is tenacious and elastic, and will not crack or chip by any reasonable expansion or mechanical distortion of the body to which it is applied.

The composition is especially desirable for use as a filler or foundation coating, or rather as a combined filler and intermediate body coating, on vehicles or the like designed for outdoor use. A single coat of the composition, which can be applied, dried and rubbed down within half a day, will take the place of the usual fillers, and also of two, three, or more coats of rough-stuff, which as ordinarily employed must each be dried and rubbed down before the application of another coat. After the drying and rubbing down of a single coat of my composition, the surface produced is suitable for the application of the desired color and varnish, or other suitable finishing materials, and the saving of time in the preliminary finishing operations is such as to effect a great economy in the manufacture or in the refinishing of articles of the class mentioned.

Now, having described my invention, what I claim and desire to secure by Letters Patent is:

1. A protective coating composition consisting of liquid gutta-percha, benzene, ether, rye flour, and plumbago, substantially as described.

2. A protective coating composition consisting of liquid gutta-percha 20%, benzene 15%, ether 25%, rye flour 20%, and plumbago 20%.

3. A protective coating composition consisting of liquid gutta-percha, a volatile hydrocarbon, an ether, a cereal flour, and a mineral coloring and thickening ingredient.

4. A protective coating composition consisting of gutta-percha, volatile solvents therefor, a cereal flour containing gluten and an unctuous mineral.

5. The herein-described composition of matter for protective coating, containing gutta-percha, volatile solvents therefor, and a cereal flour containing gluten.

In testimony whereof I have hereunto subscribed my name in the presence of two witnesses.

WALTER SCHERMERHORN.

Witnesses:
D. O. BARNELL,
A. W. JAMIESON.